(12) United States Patent
Linkner et al.

(10) Patent No.: US 7,914,077 B2
(45) Date of Patent: Mar. 29, 2011

(54) SINGLE MOTION LOAD BEARING RELEASE HANDLE

(75) Inventors: Robbie Michael Linkner, Ann Arbor, MI (US); Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 22 days.

(21) Appl. No.: 12/486,836

(22) Filed: Jun. 18, 2009

(65) Prior Publication Data

US 2010/0320812 A1  Dec. 23, 2010

(51) Int. Cl.
*B60N 2/00* (2006.01)
*B60N 2/04* (2006.01)

(52) U.S. Cl. ........ 297/331; 297/332; 297/335; 297/336; 297/183.1; 297/183.5; 296/65.03

(58) Field of Classification Search ............... 297/183.1, 297/183.5, 331, 332, 333, 335, 336; 296/65.03
See application file for complete search history.

(56) References Cited

U.S. PATENT DOCUMENTS

| | | | | |
|---|---|---|---|---|
| 4,978,158 A * | 12/1990 | Kubo et al. | ................ | 296/65.03 |
| 5,195,802 A * | 3/1993 | Hayakawa et al. | ........... | 297/335 |
| 5,224,750 A * | 7/1993 | Clark et al. | ................ | 297/335 X |
| 5,238,285 A * | 8/1993 | Holdampf et al. | ......... | 296/65.03 |
| 5,282,662 A * | 2/1994 | Bolsworth et al. | ......... | 296/65.03 |
| 5,372,398 A * | 12/1994 | Aneiros et al. | ............. | 296/65.03 |
| 5,496,088 A | 3/1996 | Stewart | | |
| 5,547,242 A | 8/1996 | Dukatz et al. | | |
| 5,697,662 A * | 12/1997 | Leftwich | .......................... | 296/63 |
| 5,800,015 A * | 9/1998 | Tsuchiya et al. | .............. | 297/331 |
| 5,951,086 A | 9/1999 | Hoshino et al. | | |
| 6,012,771 A * | 1/2000 | Shea | ........................ | 297/332 X |
| 6,053,555 A * | 4/2000 | Neale | ........................ | 296/65.03 |
| 6,065,804 A | 5/2000 | Tanaka et al. | | |
| 6,161,892 A * | 12/2000 | Chabanne et al. | ......... | 296/65.03 |
| 6,179,363 B1 | 1/2001 | Palajac et al. | | |
| 6,196,611 B1 * | 3/2001 | Lee | ........................... | 296/65.03 |
| 6,227,130 B1 * | 5/2001 | Tsumiyama et al. | .. | 296/65.03 X |
| 6,270,140 B1 | 8/2001 | Opfer et al. | | |
| 6,345,856 B1 * | 2/2002 | Minai | ........................ | 296/65.03 |
| 6,371,556 B1 * | 4/2002 | Arai | .............................. | 297/331 |
| 6,478,358 B1 * | 11/2002 | Okazaki et al. | ........... | 297/336 X |
| 6,523,899 B1 * | 2/2003 | Tame | .............................. | 297/331 |
| 6,631,879 B2 * | 10/2003 | Hibino et al. | ................ | 248/429 |

(Continued)

FOREIGN PATENT DOCUMENTS

JP          6107050          4/1994

(Continued)

*Primary Examiner* — Rodney B White
(74) *Attorney, Agent, or Firm* — Gifford, Krass, Sprinkle, Anderson & Citkowski, P.C.

(57) ABSTRACT

A seat assembly that is releasably secured to a floor, wherein the seat assembly is released from the floor by simply lifting the handle is provided. The seat assembly includes a latch assembly which releasably engages a platform such as a vehicle floor. The handle is configured to bear the load of the seat, and is also operable to actuate the latch so as to release the seat from the floor by simply lifting the seat by the handle. Thus only one motion is used to remove the seat from the floor. Further the operation of releasing the seat from the floor is inherent as it requires the user to merely lift the seat by the handle.

9 Claims, 4 Drawing Sheets

U.S. PATENT DOCUMENTS

| | | | |
|---|---|---|---|
| 6,749,264 B2 * | 6/2004 | Jeong | 297/331 X |
| 6,776,457 B2 * | 8/2004 | Muin et al. | 297/331 |
| 6,796,607 B2 | 9/2004 | Bertrand et al. | |
| 6,843,526 B2 | 1/2005 | Honda et al. | |
| 6,883,854 B2 * | 4/2005 | Daniel | 296/65.03 |
| 6,883,868 B2 * | 4/2005 | Yoshida | 297/331 |
| 6,916,057 B2 * | 7/2005 | Teich | 297/331 X |
| 7,040,702 B2 * | 5/2006 | Yamada et al. | 297/331 |
| 7,073,862 B2 * | 7/2006 | Lavoie | 297/331 X |
| 7,108,305 B2 * | 9/2006 | Frazier et al. | 296/65.03 |
| 7,152,925 B2 * | 12/2006 | Hur et al. | 297/331 X |
| 7,252,320 B2 * | 8/2007 | Tsujibayashi et al. | 297/335 X |
| 7,374,242 B2 * | 5/2008 | Champ et al. | 297/331 |
| 7,393,038 B2 * | 7/2008 | Yajima et al. | 296/65.03 |
| 7,500,707 B2 * | 3/2009 | Lutzka et al. | 296/65.03 |
| 7,568,764 B2 * | 8/2009 | Harper et al. | 297/331 |
| 7,578,536 B2 * | 8/2009 | Yajima et al. | 296/65.03 |
| 7,780,234 B2 * | 8/2010 | Grable et al. | 297/331 |
| 2005/0146186 A1 * | 7/2005 | Kinnou et al. | 297/331 |
| 2008/0122279 A1 * | 5/2008 | Park | 297/332 |

FOREIGN PATENT DOCUMENTS

| | | |
|---|---|---|
| JP | 10297331 | 11/1998 |

\* cited by examiner

SINGLE MOTION LOAD BEARING RELEASE HANDLE

FIELD OF THE INVENTION

The present invention relates generally to a seat assembly which is removably secured to a floor. In particular, the seat assembly includes a handle operable to release the seat assembly from the floor by simply lifting the seat assembly by the handle.

BACKGROUND OF THE INVENTION

It is well known to equip a seat assembly with a latching mechanism so as to removably secure the seat assembly to a floor or a platform. Such technology is often found in vehicles seat assemblies. For instance, it is known to configure seat assemblies to be releasably engaged to the vehicle floor, and to be removed therefrom by actuating a handle or a lever so as to allow the vehicle floor to be reconfigured for other uses, such as providing more floor space to create a larger storage capacity.

For example, some vehicles are equipped with a folding seat assembly slidably mounted to a rail disposed on the vehicle floor. The removal of the foldable seat requires the operator to fold the seat, pivot the folded seat about the rail, and then slide the folded seat along the rail until the seat is disengaged from the rail. Thus two motions are required and the removal of the foldable seat is not necessarily intuitive to a first time user.

In another example, the seat assembly is equipped with a handle operable to release a latching mechanism from an engaging position with the floor. Though actuating the handle alone is sufficient to disengage the latch assembly from the vehicle floor, the user is still required to perform further motions to disengage the seat assembly from a stop. Furthermore, the handle is fixedly mounted to the seat assembly and thus requires the operator to manipulate the seat assembly to achieve a comfortable carrying position.

Such seat assemblies require two hands or two different motions to remove the seat from the floor. In addition, such seat assemblies are configured such that the removal of the seat from the floor is not inherent to the user. Accordingly it is desirable to have a seat assembly which is inherently simple to remove and wherein the user can use one motion to both release the seat from the floor and carry the seat away.

SUMMARY OF THE INVENTION

A seat assembly with a handle that is operable to release the seat from a platform and by which the seat assembly may be carried is provided. The seat assembly includes a latch which releasably engages the vehicle floor. The handle is configured to bear the load of the seat, and is also operable to actuate the latch so as to release the seat from the floor by simply lifting the seat by the handle. Thus only one motion is used to remove the seat from the floor. Further the operation of releasing the seat from the floor is inherent as it requires the user to merely lift the seat by the handle.

DETAILED DESCRIPTION OF THE INVENTION

Figure 1:
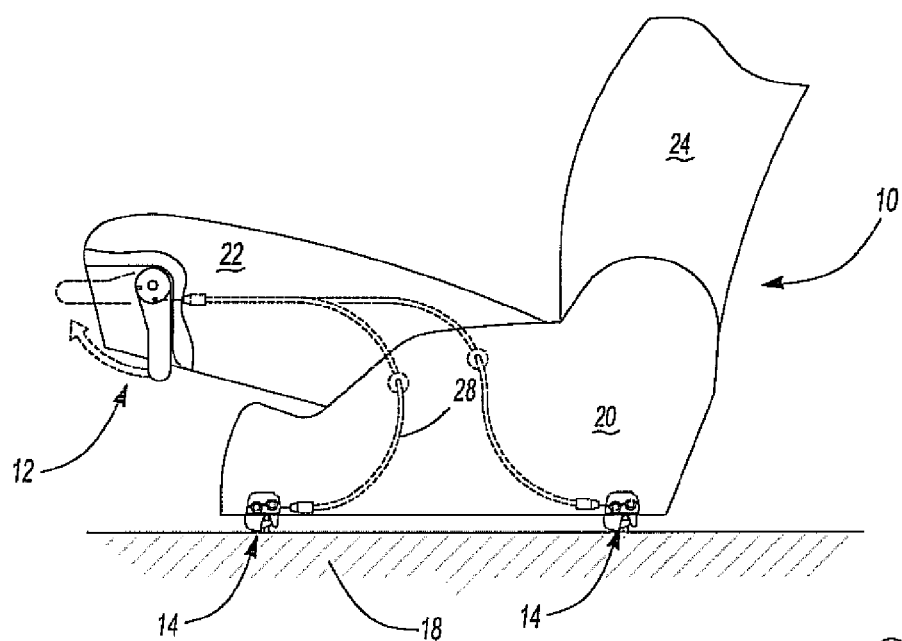
FIG. 1 is a side view of an embodiment of the seat assembly mounted to a floor.

The present invention discloses a seat assembly 10 having a load bearing handle 12 and a latch assembly 14. The handle assembly 12 is configured to bear the load of the seat assembly 10. The handle assembly 12 is operable to actuate the latch assembly 14 so as to release the seat assembly 10 from the floor 18. Accordingly the seat assembly 10 is releasably disengaged from the floor 18 by using a single motion that is inherent to the operator, namely by lifting the seat assembly 10 by the handle assembly 12.

With reference now to FIG. 1, the seat assembly 10 includes a base 20, a seat cushion 22 and a seat back 24. The base 20 is mounted to the floor 18 and the latch assembly 14 is disposed on the base 20 so as to secure the base 20 to the floor 18. The handle assembly 12 is pivotably attached to the seat assembly 10 and is operable to actuate the latch assembly 14 so as to release the base 20 from the floor 18 when the seat assembly 10 is lifted by the handle assembly 12. Though the handle assembly 12 is shown mounted to the seat cushion 22, it is anticipated that the handle assembly 12 may be mounted in other locations on the seat assembly 10 such as the base 20, head rest 26, or the seat back 24.

The latch assembly 14 is interconnected to the handle 12 by a cable 28. Any latch assembly 14 known to those skilled in the art may be suitable for use in the seat assembly 10, illustratively including the latch assembly 14 shown in the accompanying figures and described hereafter.

Figure 2:
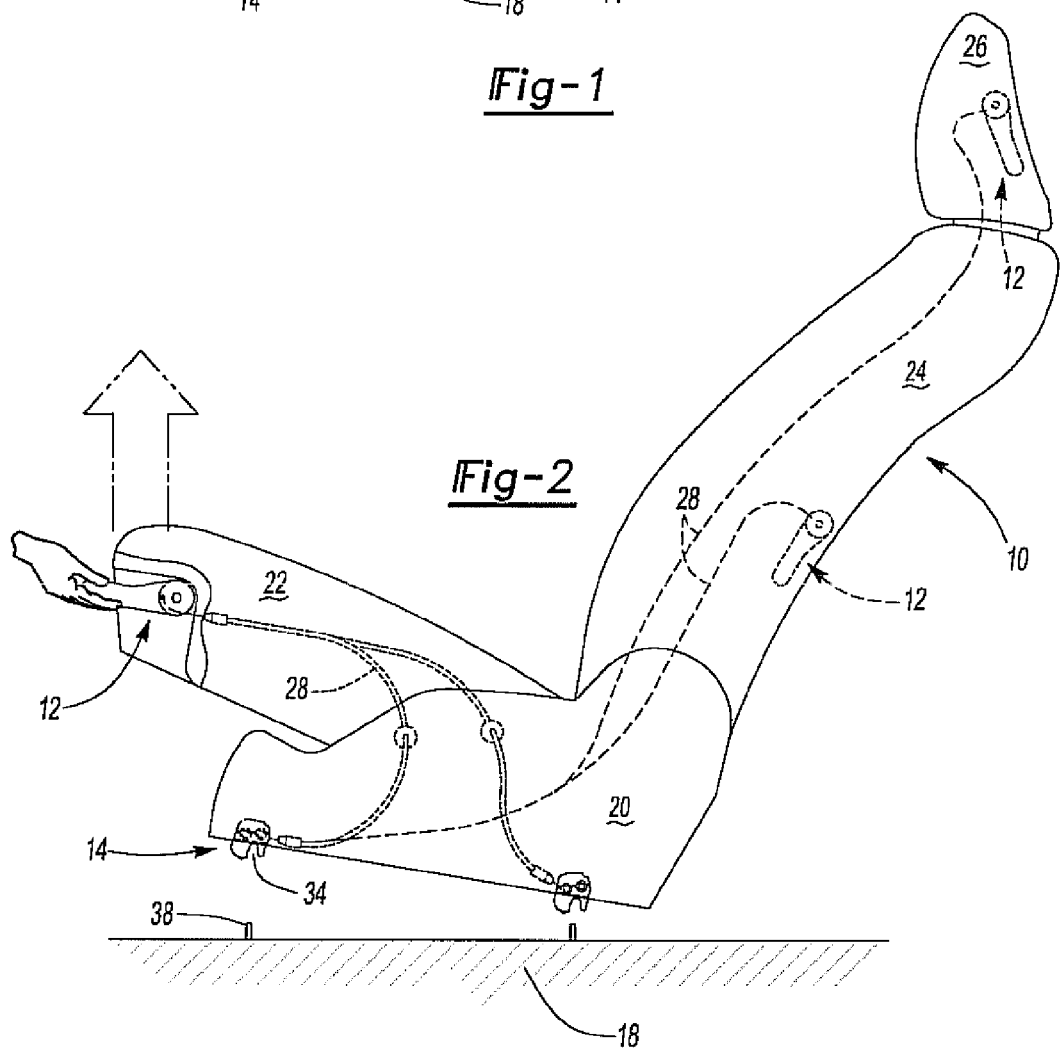
FIG. 2 is a view of FIG. 1 wherein the seat is released from the floor by lifting the seat assembly by the handle.
Figure 3:
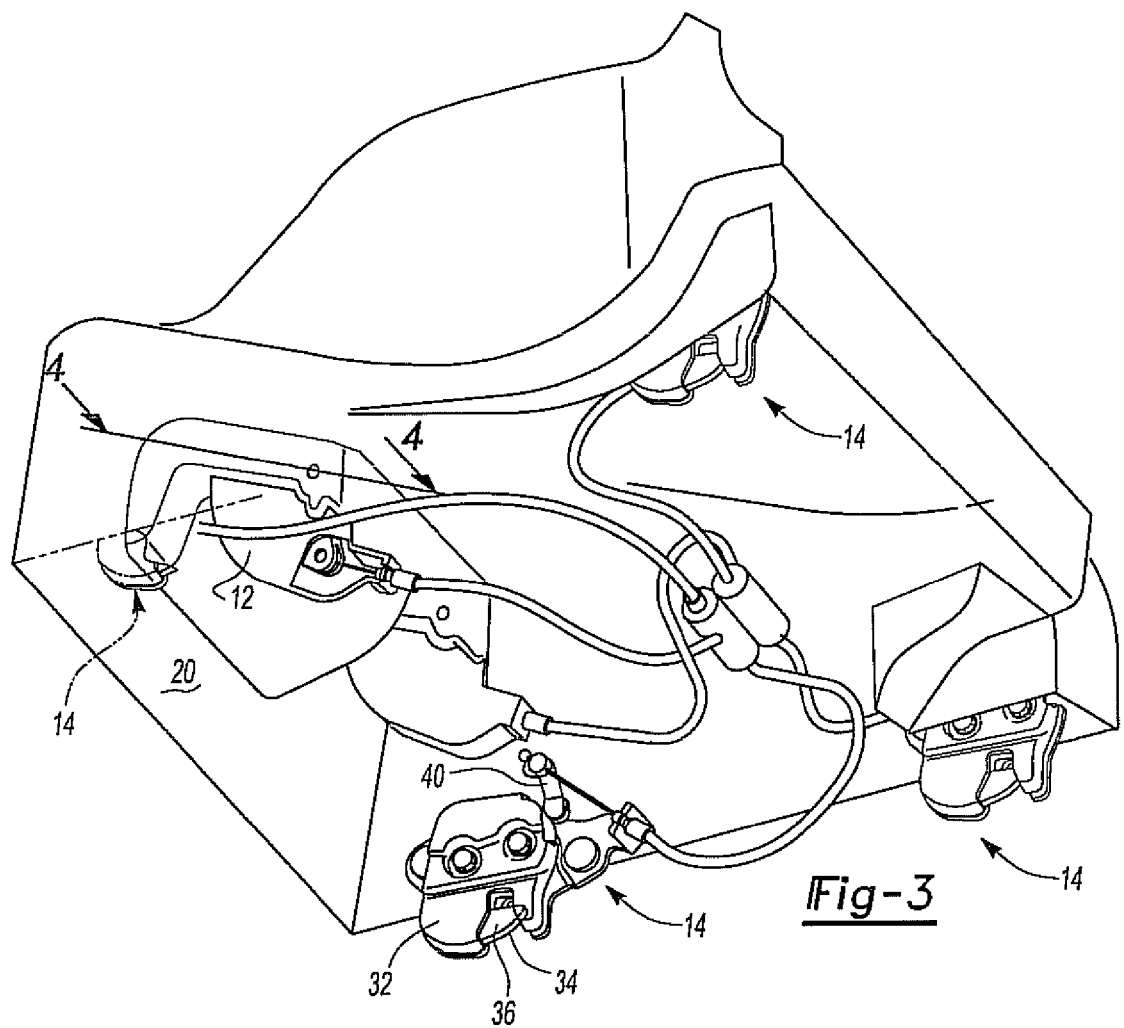
FIG. 3 is a view of the latch assembly disposed on the base of the seat, the latch assembly is actuated by a cable which is pulled when the handle is lifted.

With reference now to FIGS. 2 and 3, the latch assembly 14 includes a spring 30 and a latch body 32. The latch body 32 includes a slot 34, and a finger 36. The latch body 32 is fixedly mounted to the base 20, and the slot 34 is configured to receive a bracket 38 fixedly mounted to the floor 18. The finger 36 is pivotably mounted to the latch body 32, and the spring 30 continuously urges the finger 36 to a closed position wherein the finger 36 encloses the slot 34. Thus, when the slot 34 is registered to the bracket 38, the load of the seat assembly 10 overcomes the biasing force of the spring 30 so as place a portion of the bracket 38 within the slot 34. The bracket 38 is retained therein when the bracket 38 clears the finger 36 and the spring 30 urges the finger 36 back into the closed position.

The latch assembly 14 further includes a lever 40 pivotally mounted to a portion of the latch assembly 14. The cable 28 interconnects the lever 40 to the handle assembly 12. The lever 40 is operable to urge the finger 36 so as to overcome the biasing force of the spring 30. Specifically, when the handle assembly 12 is pulled, the cable 28 pivots the lever 40 so as to overcome the biasing force of the spring 30 and move the finger 36 free from the slot 34. Thus, the seat assembly 10 is released from the vehicle floor 18, and the user may simply lift the seat assembly 10 away.

Handle assemblies 12 are commonly understood to be a device for which to carry an article by. Accordingly, the handle assembly 12 provides an inherent means of removing the seat assembly 10 from the vehicle floor 18. Thus when the handle assembly 12 is lifted, the latch assembly 14 is disengaged from the floor 18 in the manner described above. Thus, the seat assembly 10 is free of the bracket 38 and may be carried away by the handle assembly 12 by simply lifting the handle assembly 12 upwardly along a generally vertical plane.

Figure 4:
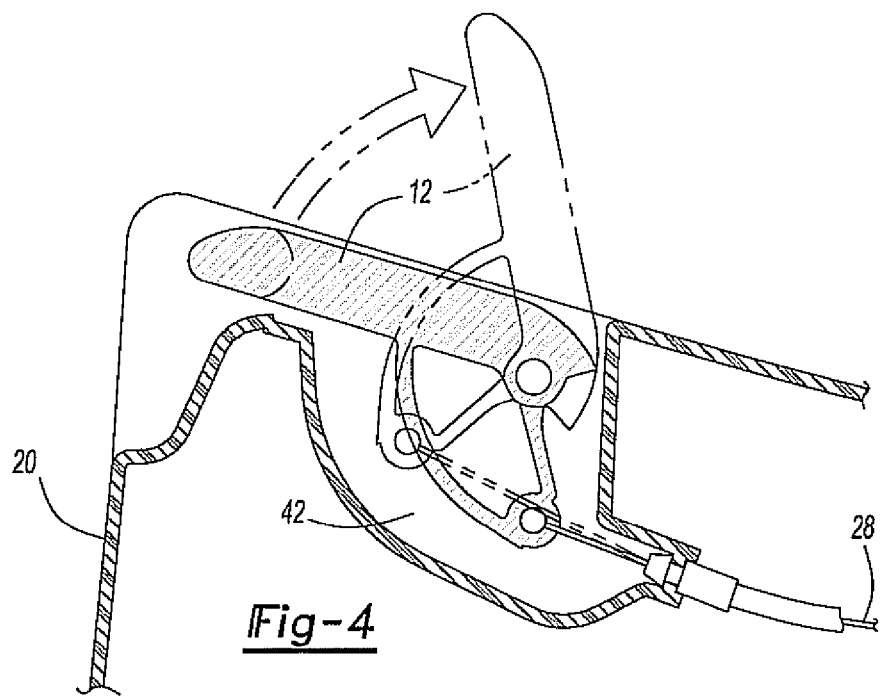
FIG. 4 is a view of the handle of the first preferred embodiment of the seat assembly, the handle is disposed within a recess of the base.

Any handle 12 known to those skilled in the art may be suitable for use in the seat assembly 10, illustratively including the handle assemblies 12 shown in the accompanying figures and described hereafter. With reference now to FIGS. 3 and 4. A handle assembly 12 is shown pivotably mounted within a recess 42 of the base 20. The cable 28 is fixedly connected to handle assembly 12 on one end and the latch assembly 14 on the other end. Thus, when the handle assembly 12 is pivoted from the recess 42, the latch assembly 14 is released from a locking engagement with the floor 18, and the seat assembly 10 is simply lifted away.

Figure 5:
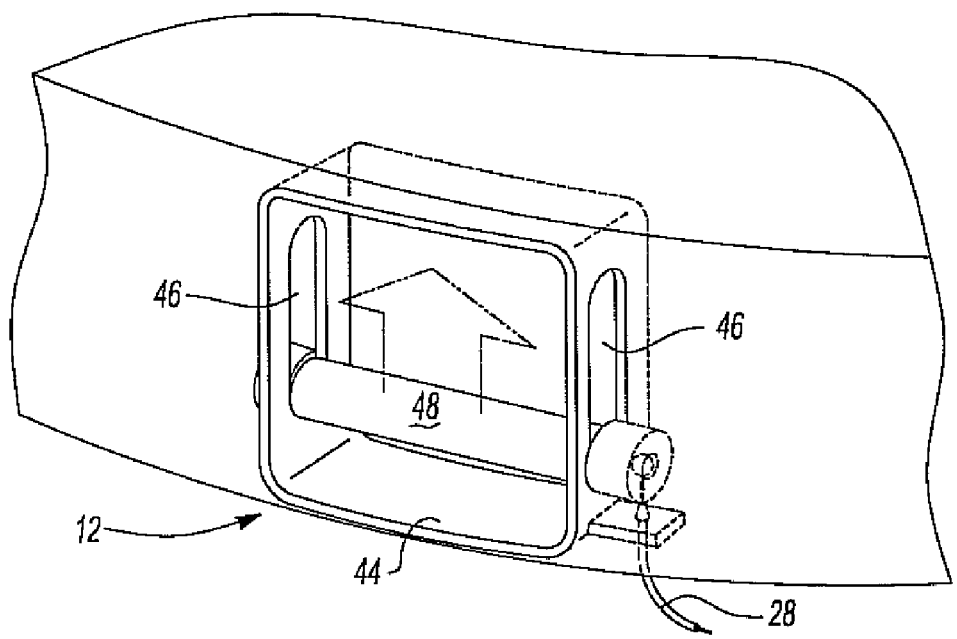
FIG. 5 is an illustrative view of another handle for use with the seat assembly.

With reference now to FIG. 5, a handle assembly 12 including a frame 44 with a pair of guides 46 disposed along opposite sides of the frame 44 is provided. The handle assembly 12 further includes a gripping member 48 slidably disposed within the guides 46. The cable 28 is connects one end of the gripping member 48 to the latch assembly 14. Thus, when the gripping member 48 is pulled upwardly along the frame 44, the cable 28 actuates the latch assembly 14 so as to release the seat assembly 10 from a locking engagement with the floor 18 in the manner described above, and the seat assembly 10 is simply lifted away.

Figure 6:
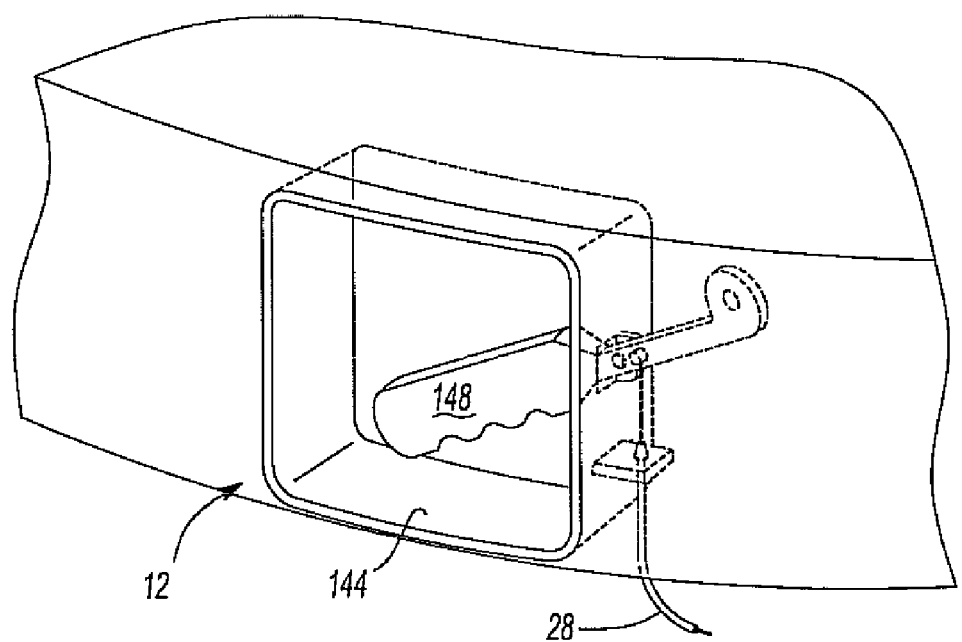
FIG. 6 is another illustrative view of a yet another handle for use with the seat assembly.

With reference now to FIG. 6, a handle assembly 12 including a frame 144 and a gripping member 148 pivotally attached to the frame 144 is provided. One end of the gripping member 148 is disposed within the frame 144 and the other end of the gripping member 148 is disposed outside of the frame 144. One end of the cable 28 is attached to the portion of the gripping member 48 disposed outside of the frame 44, and the other end of the cable 28 is attached to the latch assembly 14. Thus, when the gripping member 148 is pivoted towards the upper portion of the frame 144, the cable 28 actuates the latch assembly 14 so as to release the seat assembly 10 from a locking engagement with the floor 18, and the seat assembly 10 is simply lifted away.

Figures 7, 8:
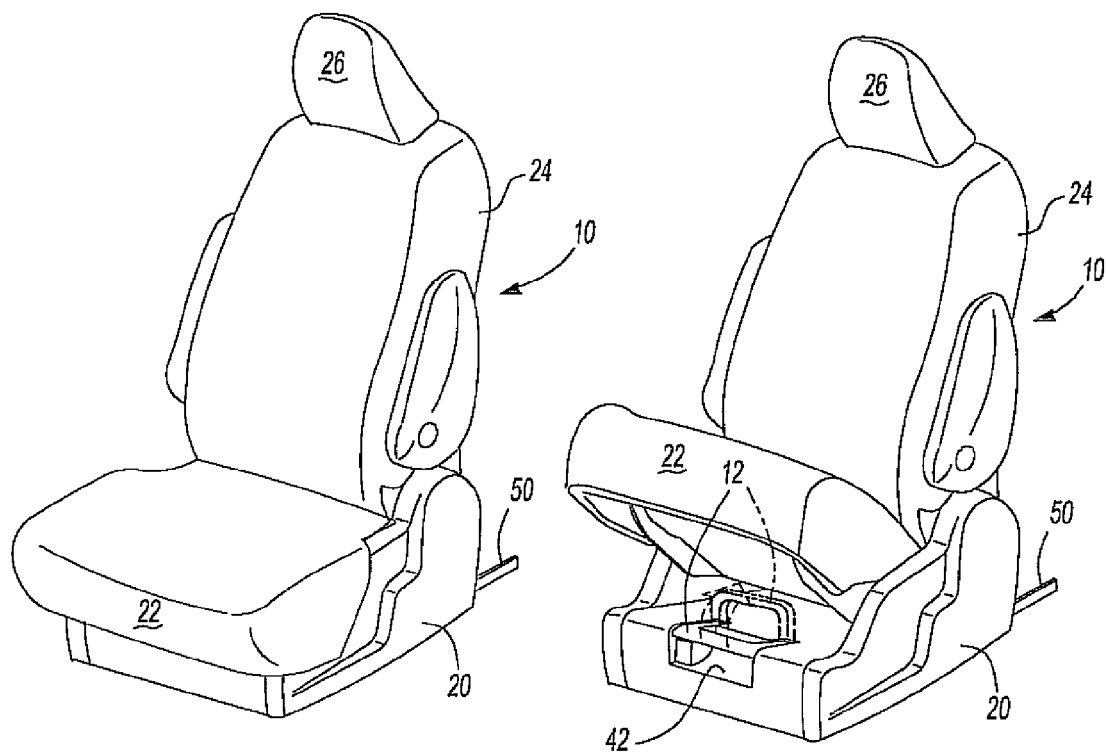
FIG. 7 is a view of the first preferred embodiment of the seat assembly, the handle is disposed within a recess of the base, and the seat cushion is pivotably attached to the base so as to move between a first position where the seat cushion lies flush against the base so as to hide the handle, and a second position where the seat cushion is pivoted away from the base so as to provide access to the handle, the seat cushion is shown in the first position
FIG. 8 is a view of FIG. 7 wherein the seat cushion is in the second position.

With reference to FIGS. 3 and 7, and 8, a first preferred embodiment of the seat assembly 10 is provided. Tile seat assembly 10 includes a seat cushion 22 pivotably mounted on the base 20. The seat cushion 22 is movable between a first position and a second position. In the first position the seat cushion 22 is flush against the base 20 and in the second position the seat cushion 22 is spaced apart from the base 20 such that the handle assembly 12 is accessible. Thus, the handle assembly 12 remains hidden from the vehicle occupants when the seat cushion 22 is in the first position.

With reference again to FIGS. 3, 4 and 8, the base 20 includes a recess 42 and the handle 12 is housed within the recess 42. When the seat cushion 22 is placed in the second position, the handle assembly 12 is accessible. The seat assembly 10 is released from a locking engagement with the floor 18 by simply lifting the seat 16 along a generally vertical plane. Thus the seat assembly 10 may be easily disengaged from a locking engagement with the floor 18 in tie manner described above and may be carried away by using only one hand and performing a single inherent motion.

The seat assembly 10 further includes a pair of cables 28. Each of the pair of cables 28 interconnects the handle assembly 12 to two of the four latches 14. Specifically, one cable is connected to one end of the handle assembly 12. The cable 28 is split and one end of the cable 28 is shown attached to the front left latch 14 and the other end of the split cable is attached to the front rear latch 14. Likewise, the other of the pair of cable 28 is attached to an opposite end of the handle assembly 12, the cable 28 is split and one end of the split cable 28 is connected to the rear left latch 14 and the other of the split end is attached to the rear right latch 14. Accordingly, the actuation of the handle assembly 12 releases all four latches 14 from the floor 18. The seat assembly 10 is then free to pivot about the handle assembly 12 so as to align the center of gravity of the seat assembly 10 with the handle assembly 12.

Figure 9:
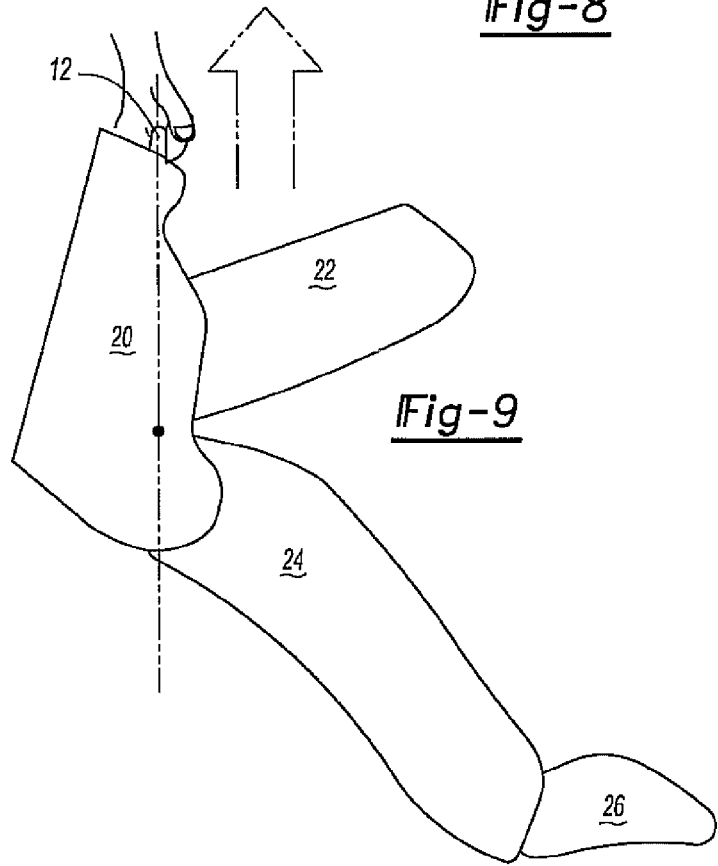
FIG. 9 is a side view of the subject seat assembly showing the center of gravity, indicated by the solid circle, of the seat assembly aligning itself with the handle when the seat assembly is carried.

With reference now to FIG. 9, the handle assembly 12 is pivotably attached to the base 20 such that the center of gravity of the seat assembly 10 (as indicated by the solid dot disposed on the base 20) is aligned with the handle assembly 12 (as shown by the broken line), thus making the seat assembly 10 easier to carry away. Accordingly, the handle assembly 12 may be disposed in other locations of the seat assembly 10, and may be pivotably mounted to the seat assembly 10 using a bearing assembly, thus enabling the center of gravity of the seat 16 to align itself with the handle assembly 12 as shown in FIG. 8. For example, the handle assembly 12 may be disposed on the seat cushion 22, head rest 26, along any one of the sides of the seat cushion 22, or the like.

The seat assembly 10 may be mounted to the floor 18 in any manner known to those skilled in the art, illustratively including the use of a rail 50 as shown in FIG. 7 and described hereafter. The rail 50 is mounted to the floor 18 and the base 20 is configured to slidingly attach to the rail 50 The rail 50 includes a plurality of teeth (not shown) and the latch assembly 14 is configured to engage any of the teeth so as to secure the seat assembly 10 in a desired position along the rail 50 As set forth above, the handle assembly 12 is interconnected to the latch assembly 14 by a cable 28 and the cable 28 is operable to bias the lever 40 against the finger 36 when the handle assembly 12 is lifted up thus disengaging the latch assembly 14 from the rail 50 and allowing the user to remove the seat assembly 10 by simply lifting the seat assembly 10 by the handle 12.

Obviously many modifications and variations of the seat assembly 10 disclosed are possible in light of the above description and may be practiced otherwise than as specifically described while within the scope of the above described seat assembly 10.

We claim:

1. A seat assembly having a base, a seat cushion and a seat back, wherein the base is adapted to be mounted to a floor, said seat assembly comprising:
   a latch assembly for releasably securing the base to the floor; and
   a handle operable to release and carry the seat assembly, the handle pivotably attached to a front edge of either the base or the seat cushion of the seat assembly, the handle pivotable about a horizontal axis, the handle operable to actuate the latch assembly when pivoted in an upwardly manner with respect to the floor so as to release the base from the floor when the seat assembly is lifted by the handle, and wherein the seat assembly pivots about the handle so as to align the center of gravity of the seat assembly along a generally two-dimensional plane with respect to the horizontal axis of the handle so as to facilitate lifting and carrying of the seat assembly.

2. The seat assembly as set forth in claim 1 wherein the handle is pivotably mounted to the base.

3. The seat assembly as set forth in claim 1 further including a seat cushion pivotably mounted to the base and movable between a first position wherein the seat cushion is flush against the base and a second position wherein a portion of the seat cushion is displaced from the base, and wherein the latch assembly is disposed on the base and accessible when the seat cushion is in the second position.

4. The seat assembly as set forth in claim 1, further including a cable interconnecting the handle to the latch assembly, wherein one end of the cable is fixedly secured to the handle and the other end of the cable is fixedly secured to the latch assembly, and wherein the cable actuates the latch assembly when the handle is pivoted away from the base.

5. The seat assembly as set forth in claim 1 wherein the latch assembly includes a spring and a latch body having a slot and a finger pivotably mounted to the latch body, wherein the spring continuously urges the finger to enclose the slot and retain a bracket therein, and wherein the latch assembly further includes a lever pivotably mounted to the latch assembly, wherein the lever is connected to one end of the cable, and wherein lifting the handle causes the cable to rotate the lever so as to urge the finger to overcome the biasing force of the spring and move the finger from engagement with the bracket.

6. The seat assembly as set forth in claim 1 wherein the base further includes a recess formed at the front edge of the base and the handle is housed within the recess.

7. The seat assembly as set forth in claim 1 further including a rail mounted to the floor, the rail including a plurality of teeth, wherein each of the plurality of teeth are spaced apart from each other.

8. The seat assembly as set forth in claim 7 wherein the base is configured to slidingly attach to the rail, and wherein the latch assembly is configured to engage any one of the plurality of teeth so as to position the seat assembly along a predetermined portion of the rail.

9. A seat assembly having a base and a seat back, wherein the base is mounted to a floor, said seat assembly comprising:
  a latch assembly releasably securing the base to the floor, wherein the latch assembly includes four latches releasably engaged to the floor; and
  a handle pivotably attached to the seat assembly, the handle operable to actuate the latch assembly so as to release the base from the floor when the seat assembly is lifted by the handle;
  a pair of cables each of the pair of cables interconnecting the handle to two of the four latches, each of the pair of cables having a pair of split ends, each split end mechanically connected to a respective one of the four latches, wherein actuation of the handle releases all four latches from the floor, and wherein the seat assembly pivots about the handle so as to align the center of gravity of the seat assembly with the handle.

* * * * *

UNITED STATES PATENT AND TRADEMARK OFFICE
CERTIFICATE OF CORRECTION

| | | |
|---|---|---|
| PATENT NO. | : 7,914,077 B2 | Page 1 of 1 |
| APPLICATION NO. | : 12/486836 | |
| DATED | : March 29, 2011 | |
| INVENTOR(S) | : Robbie Michael Linkner et al. | |

It is certified that error appears in the above-identified patent and that said Letters Patent is hereby corrected as shown below:

Column 1, Line 64, Replace "scat" with --seat--

Column 4, Line 6, Replace "tie" with --the--

Column 4, Line 41, Replace "the rail 50 The" with --the rail 50. The--

Column 4, Line 44, Replace "the rail 50 As" with --the rail 50. As--

Signed and Sealed this

Twentieth Day of December, 2011

David J. Kappos
*Director of the United States Patent and Trademark Office*